United States Patent
Gimenez Vidal

(10) Patent No.: US 8,057,348 B2
(45) Date of Patent: Nov. 15, 2011

(54) DIFFERENTIAL FOR VEHICLES

(76) Inventor: Jose Gimenez Vidal, Vilassar De Dalt (ES)

( * ) Notice: Subject to any disclaimer, the term of this patent is extended or adjusted under 35 U.S.C. 154(b) by 798 days.

(21) Appl. No.: 12/066,522

(22) PCT Filed: Sep. 5, 2006

(86) PCT No.: PCT/EP2006/066014
§ 371 (c)(1),
(2), (4) Date: Mar. 12, 2008

(87) PCT Pub. No.: WO2007/031439
PCT Pub. Date: Mar. 22, 2007

(65) Prior Publication Data
US 2008/0220926 A1    Sep. 11, 2008

(30) Foreign Application Priority Data

Sep. 14, 2005 (ES) .................................. 200502233

(51) Int. Cl.
*F16H 48/20* (2006.01)
(52) U.S. Cl. ...................................................... 475/248

(58) Field of Classification Search .................. 475/248, 475/249
See application file for complete search history.

(56) References Cited

U.S. PATENT DOCUMENTS

| | | | | |
|---|---|---|---|---|
| 5,292,291 A * | 3/1994 | Ostertag | ...................... | 475/252 |
| 5,302,159 A * | 4/1994 | Dye et al. | ...................... | 475/227 |
| 5,389,048 A * | 2/1995 | Carlson | ...................... | 475/252 |
| 5,735,766 A * | 4/1998 | Sacchettini et al. | .......... | 475/249 |
| 6,402,656 B1 * | 6/2002 | Peralta | ...................... | 475/252 |
| 7,651,436 B2 * | 1/2010 | Sugitani | ...................... | 475/342 |

* cited by examiner

*Primary Examiner* — Ha D. Ho
(74) *Attorney, Agent, or Firm* — Lawrence G. Fridman

(57) ABSTRACT

The differential for vehicles comprises a rotatable carcass (1) inside which are housed a pair of planetary gears (2) rotatably integral with the axle shafts of two of the wheels of the vehicle, and at least a pair of satellite gears (5) linked to each other and movable to each other, each of said satellite gears (5) being rotatably integral with one of said planetary gears (2), and it is characterized in that said satellite gears (5) are linked to each other by threaded cylinders (3) with inverted threads with the same pitch and diameter. It permits always the differentiation of rotation between the wheels.

14 Claims, 5 Drawing Sheets

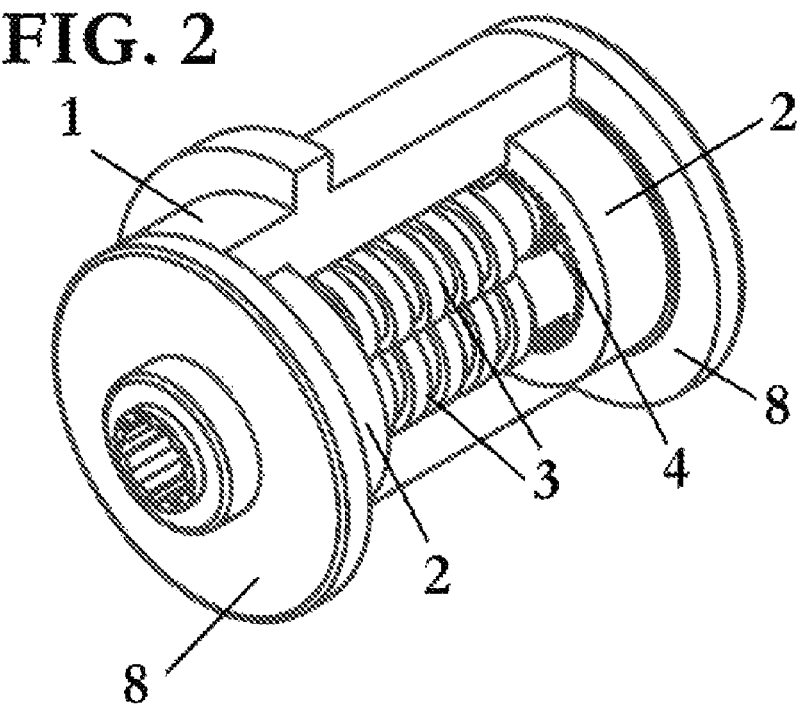
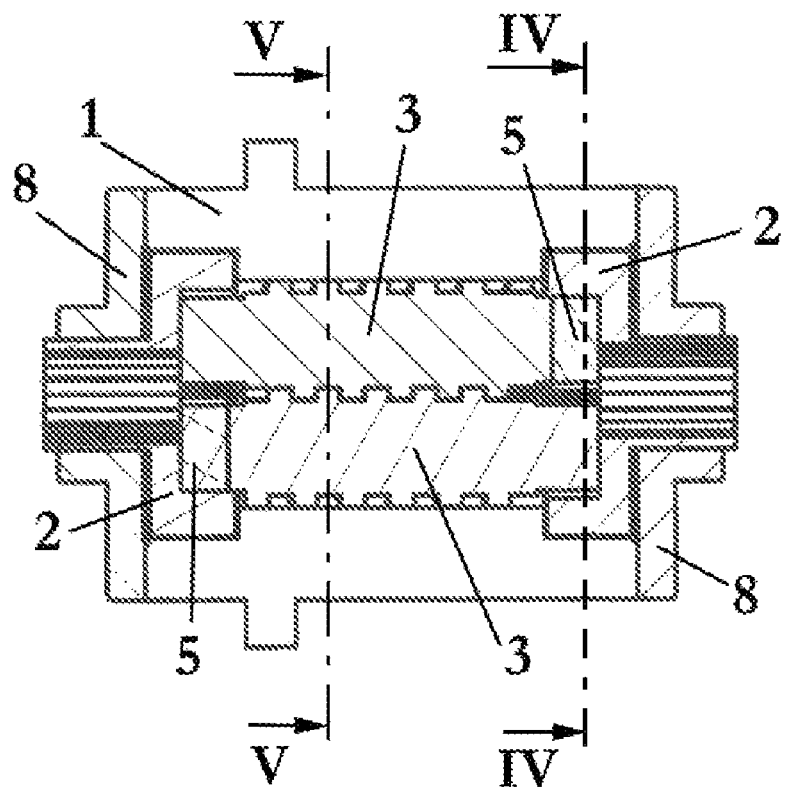

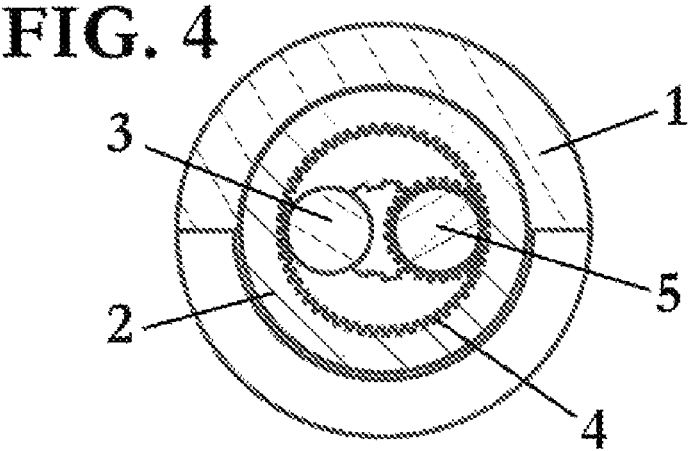
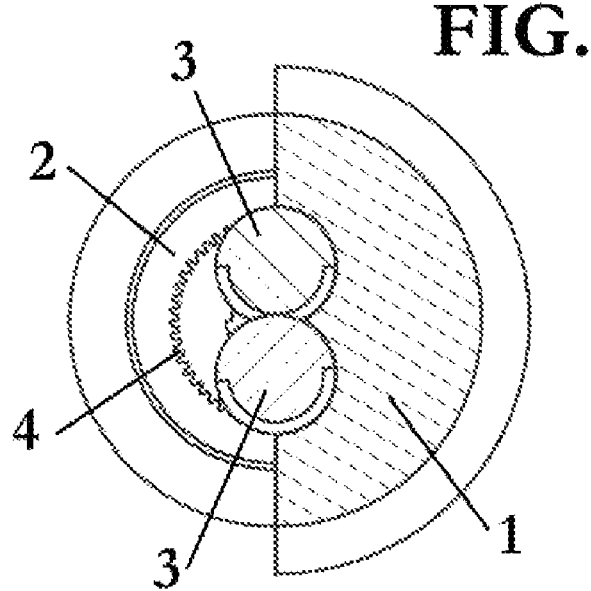

DIFFERENTIAL FOR VEHICLES

CROSS-REFERENCE TO RELATED APPLICATION

The present application is the U.S. National Phase of International Patent Application No. PCT/EP2006/066014, filed Sep. 5, 2006, which in turn is based upon and claims priority from Spanish Patent Application Serial No. P-200502233, filed Sep. 14, 2005, each of which is incorporated by reference in its entirety.

The present invention refers to a differential for vehicles, which is placed between the axle shafts of the driving wheels of a vehicle.

BACKGROUND OF THE INVENTION

It is known that the differential at a vehicle is placed between the axle shafts of the driving wheels of a vehicle, and it permits the differentiation in the revolutions of each wheel when the vehicle turns.

Now there are known differentials which have been enhanced the performance of the conventional differentials. These differentials are generally formed by gears meshed to each other, so that they are slightly movable, creating therefore friction between components, trying the wheels not to spin.

These differentials strength the differential system by friction, so that the wheel spins later, but they have the drawback that the wheels are always positively meshed to each other and depending on them. The helical teeth permits the continuous rotation of the satellite gears, and at the same they move to each other to generate friction.

As it is known, in the present description the planetary gears are disclosed as those gears which transmit the rotating movement to the axle shafts of the wheels, and the satellite gears are those which permit the differentiation in the revolutions of the wheels.

EP-A-0 233 583 discloses a differential making possible the locking of axle shafts, with two pairs of bevel gears and a pair of mutually mating worms, wherein onto two mutually parallel auxiliary shafts that are incorporated into a two-piece yoke that is constructed mirror-symmetrically with regard to the respective jointing plane, there are placed to the left and to the right of this jointing plane and at equal distance thereof two equal, yet oppositely oriented one-piece assemblies consisting of a bevel gear, a worm constructed for the limit of the self-locking and of a hub, with the bevel gear mating a sleeve-type spur-bevel gear, whose axis is perpendicular to the jointing plane and which spur-bevel gear is journalled in a bearing hub of the yoke and placed on a spline shaft of a driving wheel shaft.

DESCRIPTION OF THE INVENTION

With the differential of the invention said drawbacks are solved, presenting other advantages that will be disclosed.

The differential for vehicles comprises a rotatable carcass inside which are housed a pair of planetary gears rotatably integral with the axle shafts of two of the wheels of the vehicle, and at least a pair of satellite gears linked to each other and movable to each other, each of said satellite gears being rotatably integral with one of said planetary gears, satellite gears being linked to each other by threaded cylinders with inverted threads with the same pitch and diameter, Advantageously, said threads of the satellite gears can be trapezoidal threads or square threads.

each planetary gear being formed by a socket provided with an internal teeth, or each planetary gear comprises a rim, and each planetary gear comprises an associated friction disk.

Depending on the features of the vehicle, the differential of the present invention can comprise one, two, three or more pairs of satellite gears, or the number of pairs suitable according to the requirements of the vehicle.

Advantageously, said carcass comprises housings for said threaded cylinders.

The differential of the present invention can be used in vehicles of frontal, real or total traction, and also in vehicles with a central differential.

With the differential of the present invention are obtained the following advantages:

It permits always the differentiation of turn of the wheels;
It does not permit the wheels to skid;
It does not permit one wheel to stop if the other rotates;
It maintains a constant distribution of the traction at both wheels;
If one of the wheels looses contact with the ground, the other receives total traction;
It is easy to manufacture;
It comprises a reduced number of pieces;
Its weight is light and it occupies a reduced volume, compared with an equivalent standard differential;
It can be done to be adjusted to all features and loads;
It makes unnecessary the use of an electronic traction control.

BRIEF DESCRIPTION OF THE DRAWINGS

For a better understanding of what has been showed, some drawings are attached, in which, diagrammatically and only as a non-limitative example, a practical case of embodiment is shown.

FIG. 2 is a perspective view of the differential of the present invention according to said first embodiment, the carcass being partially sectioned;

FIG. 3 is a longitudinal section view of the differential of FIG. 2;

FIG. 4 is a cross-section view along line IV-IV in FIG. 3;

FIG. 5 is a section view along line V-V in FIG. 3;

DESCRIPTION OF PREFERRED EMBODIMENTS

Figure 1:
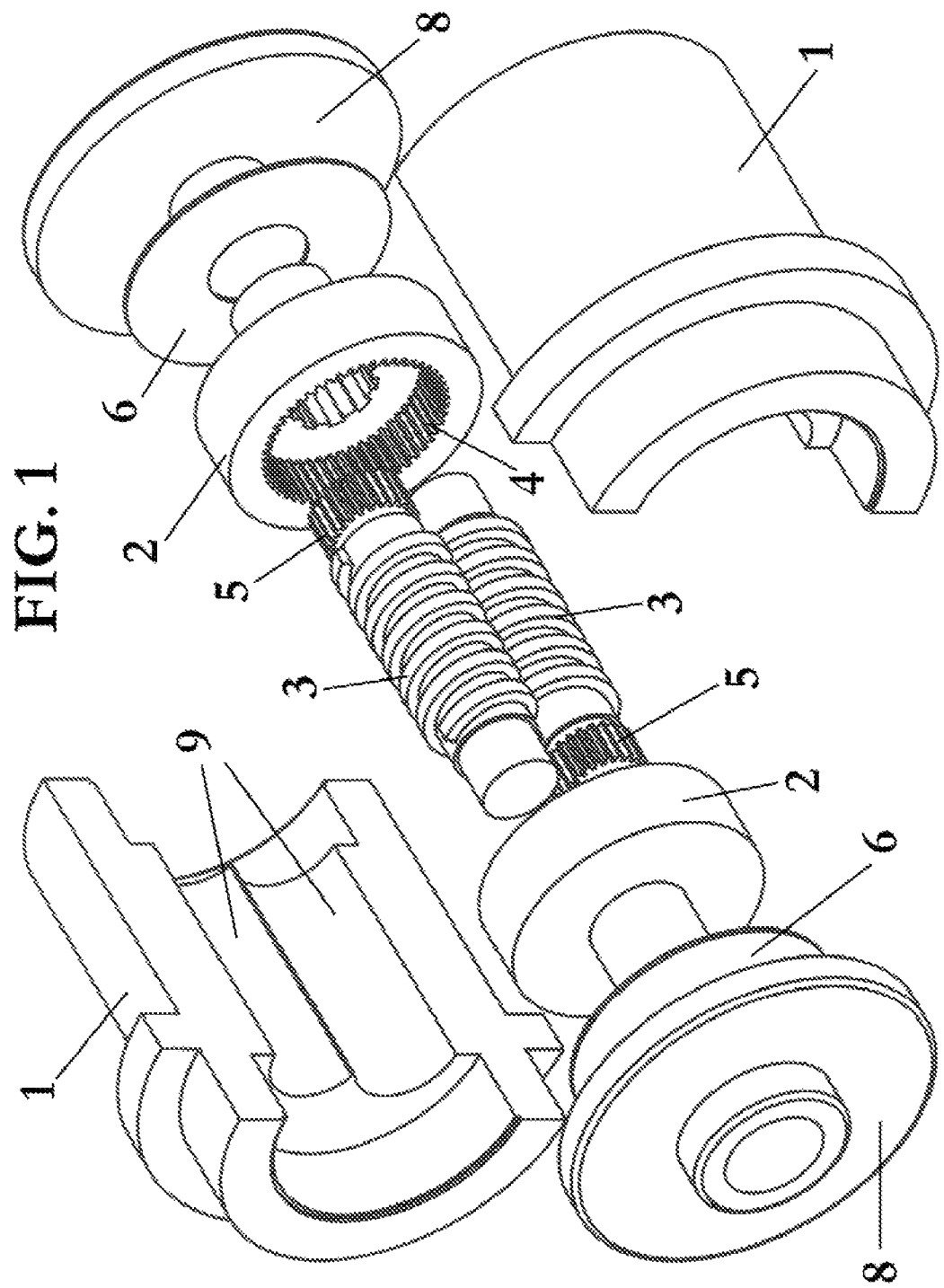
FIG. 1 is an exploded perspective view of the components which form the differential of the present invention, according to a first embodiment.

As it can be seen from FIG. 1 to 5, in which it is shown a first embodiment of the differential of the present invention, this differential comprises a rotating carcass 1, driven by the vehicle transmission, inside which a pair of planetary gears 2 are housed, each of them is rotationally integral with the axle shafts of two of the wheels of a vehicle (not shown), and a pair of satellite gears 5 with their threaded cylinders 3, one left threaded and the other right threaded, both with the same pitch and diameter, and interconnected at their periphery and longitudinally movable to each other guided by housings 9 provided at the carcass 1.

Each threaded cylinder 3 comprises at one of the end a teeth 5 with meshes with one of the planetary gears 2.

According to the shown embodiment, each planetary gear 2 is formed by a socket provided with an internal teeth 4, and it is associated to a friction disk 6.

The satellite gears 5 are linked to each other by inverted threads, which can be of trapezoidal or square profile. The role of said threads is to move longitudinally a threaded cylinder 3 to the other. When the vehicle moves in straight line, the two wheels rotate at the same revolutions and the satellite gears 5 with their threaded cylinders 3 move to each other to lock the differential. When the vehicle turns, i.e., when the revolutions of one of the wheels is different from the revolutions of the other wheel, the satellite gears 5 with their threaded cylinders 3 do not move because they rotate with the same velocity and in opposite directions, therefore permitting the differentiation.

To understand better the operation of the differential of the present invention it is essential to understand first the functionality of a pair of satellites interconnected by their cylinders of inverted threads, because they are the essence of the system.

Taking into account that both satellites, interconnected by their inverted threaded cylinders, are guided and aligned longitudinally, so that none of them protrudes to each other, it happens that:

a) When the satellites rotate in the same direction, they move and expand;

b) When the satellites rotate at different velocities, and independently of its rotating direction, they move and expand;

c) When one of the satellites rotates and the other remains stationary, they move and expand;

d) Only when the satellites rotate at the same velocity and in opposite directions they do not move nor expand.

Therefore, it can be seen that the satellites move and expand always, except when it happens the condition d), which is the condition which permits the differentiation between the wheels and prevents the loss of traction of them.

The operation of the differential of the present invention is as follows:

When the carcass 1 is forced to rotate (about bearings not shown) by the motor action of the transmission of the vehicle, the planetary gears 2 connected directly to the stationary wheels and that support the weight of the vehicle and resist to rotate, but the satellites 5 with they threaded cylinders 3 (threaded in opposite directions) meshed and with their gears directly meshed with the internal teeth of the planetary gears 2 are forced to rotate in the same direction and velocity than the housings 9 of the carcass 1 and forced by the rotation of the opposite threads, when they expand, moving outwardly the planetary gears 2 and trapping the friction discs 6 against lids 8 integral with the carcass 1. Therefore, all the mechanism is locked and both wheels are forced to rotate with the rotation of the mechanism, beginning the movement of the vehicle in a straight line.

When the vehicle requires a rotation differentiation between the wheels and when the vehicles turns, the external wheel of the curve is forced to rotate quicker, and the internal wheel of the curve rotates slower than the nominal rotation of the carcass 1 of the differential, which gives rise the meshed threaded cylinders 3 to rotate in opposite directions, but at the same velocity than of the forced rotation of the planetary gears 2, the threaded cylinder releasing locking pressure from the planetary gear 2 of the external wheel, and simultaneously the threaded cylinder 3 of the internal planetary gear 2 increases proportionally the pressure, permitting a balanced differentiation just to turn the vehicle.

If one the wheels begins a loss of traction, the rotation of the meshed threaded cylinders 3 would continue in opposite directions, but at different velocities, which would tend to expand the meshed threaded cylinders 3, give rise at the same time an increase of the locking pressure, which would eliminate instantly the attempt of loss of traction at the same moment it begins. The locking pressure of the differential is proportional to the torque.

Figure 6:
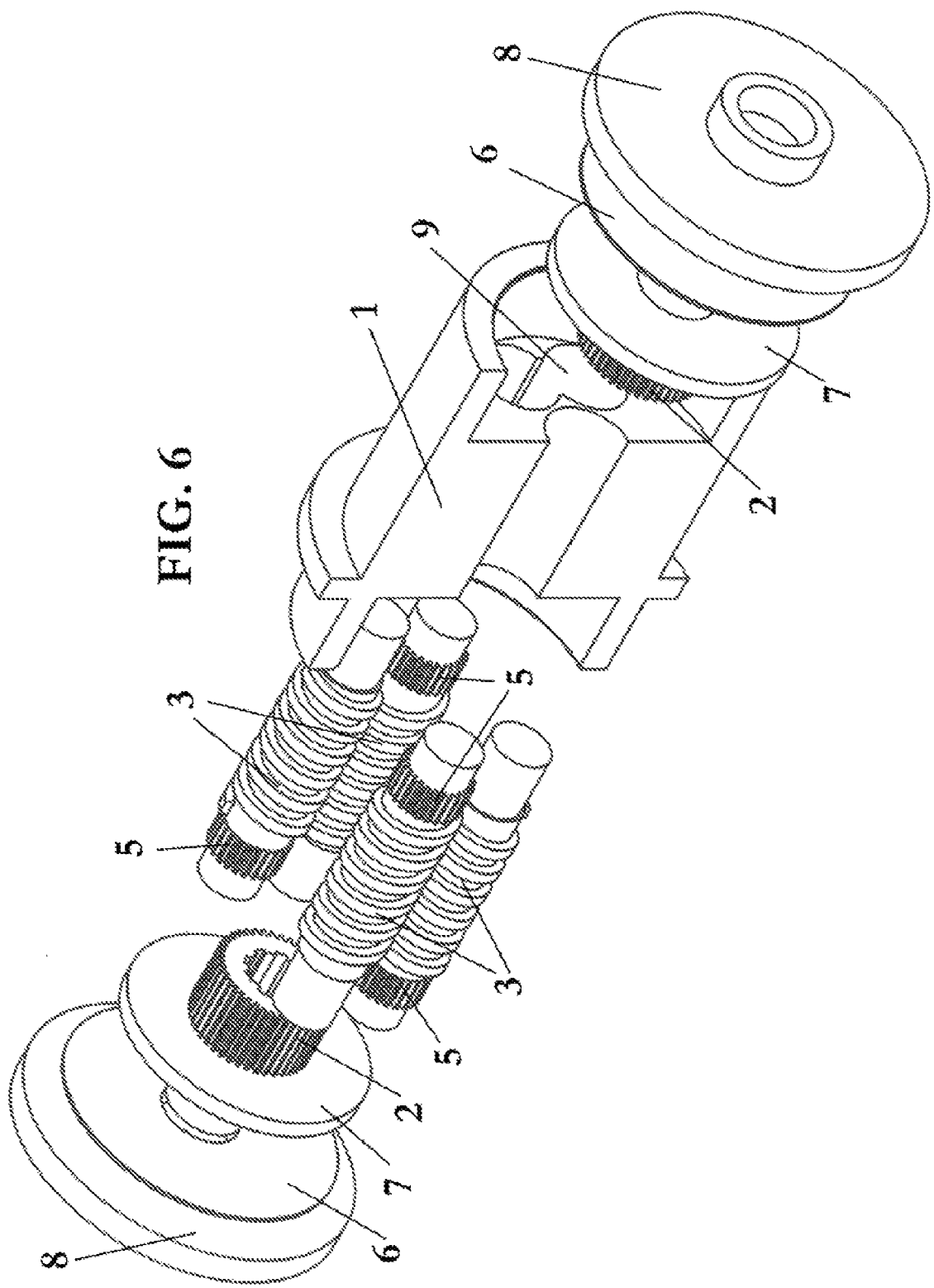
FIG. 6 is an exploded perspective view of the components which form the differential of the present invention, according to a second embodiment.

In FIG. 6 it is shown a second embodiment of the differential of the present invention. The main difference with respect to the previous embodiment is a two pairs of satellite gears 5 with their corresponding threaded cylinders 3. Furthermore, instead of the socket, each planetary gear 2 is formed by a gear wheel which comprises a rim 7. Also in this case, each planetary gear 2 is associated with a friction disk 6.

Figure 7:
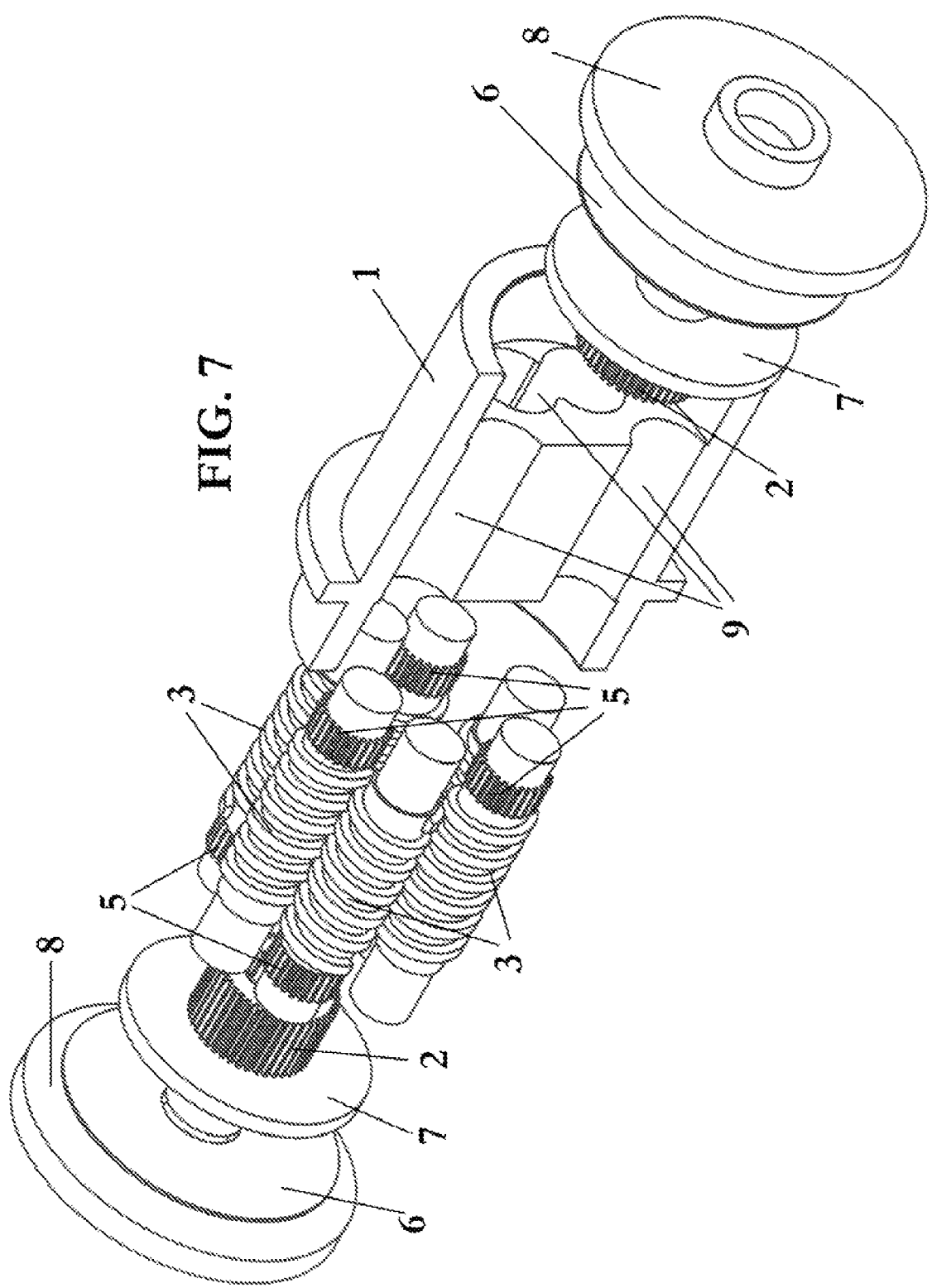
FIG. 7 is an exploded perspective view of the components which form the differential of the present invention, according to a third embodiment.

In FIG. 7 it is shown a third embodiment of the differential of the present invention, and the only difference with respect to the previous embodiment is that it comprises three pairs of satellite gears 5 with their corresponding threaded cylinders 3.

It must be pointed out that the thread of the satellite gears can be any suitable thread, i.e. it can be of different profiles and depths. As stated above, the objective of the thread is that one of the satellite gears moves longitudinally to each other, without dragging, i.e. none of the satellite gears rotates by the action of the thread, which is different from the differentials already known, in which the helical gears promote said rotational movement.

Even though reference is made to particular embodiments of the invention, it is apparent for a person skilled in the art that the differential disclosed is susceptible of numerous variations and modifications, and that all the details can be substituted by other technically equivalent ones, without departing from the scope of protection defined by the attached claims.

The invention claimed is:

1. A differential for a vehicle, comprising:
a rotatable carcass;
a pair of planetary gears situated within said carcass, each said planetary gear is rotatably associated with an axle shaft of a wheel of a vehicle; and
at least a pair of mutually engaged threaded cylinders including a first cylinder and a second cylinder; each said cylinder having distal and proximal ends with a central area disposed therebetween, a satellite gear provided at one of said distal or proximal ends of each said threaded cylinder for engagement with the respective planetary gear, threads are formed within each said cylinder extending between said distal and proximal ends and within the central area thereof; said threads of said first and second cylinders have substantially identical length, engagement of the threads of the first and second cylinders causes longitudinal motion of said cylinders and said satellite gears relative to each other.

2. A differential according to claim 1, wherein said threads of the threaded cylinders associated with the satellite gears are trapezoidal threads.

3. A differential according to claim 1, wherein said threads of the threaded cylinders associated with the satellite gears are square threads.

4. A differential according to claim 1, wherein said at least one pair of threaded cylinders comprises a plurality of the pairs of satellite gears with their corresponding threaded cylinders.

5. A differential according to claim 1, wherein said carcass comprises housings for said threaded cylinders.

6. A differential according to claim 1, wherein said threads of the cylinders are inverted threads having substantially identical pitch and diameter.

7. A differential according to claim 1, wherein a longitudinal axis extends within each said threaded cylinder between said distal and proximal ends, said engagement of the threads of the first and second cylinders causes the longitudinal motion of said cylinders and the respective satellite gears relative to each other and along said longitudinal axes.

8. A differential according to claim 1, wherein each said planetary gear is formed as a socket having an internal area, a plurality of internal teeth provided within the internal area of the socket, each said satellite gear is formed with a plurality of external teeth; said longitudinal motion of the cylinders causes longitudinal motion of the external teeth of the satellite gear relative the internal teeth of the planetary gear socket.

9. A differential according to claim 1, wherein each said planetary gear further comprises an associated friction disk.

10. A differential according to claim 1, wherein said satellite gears of said first and second cylinders are not rotated by the threads engagement.

11. A differential for a vehicle, comprising:
a rotatable carcass;
a pair of planetary gears situated within said carcass, each said planetary gear is formed with at least a base wall and a plurality of teeth, each said planetary gear is rotatably associated with an axle shaft of a wheel of a vehicle;
at least a pair of mutually engaged threaded cylinders including a first cylinder and a second cylinder; each said cylinder having distal and proximal ends with a central area disposed therebetween, a satellite gear having a plurality of external teeth provided at one of said distal or proximal ends of each said threaded cylinder for engagement with the respective planetary gear, threads formed within each said cylinder extending between said distal and proximal ends and within the central area thereof; said threads of the cylinders are inverted threads having substantially identical length, pitch and diameter; and
engagement of the threads of the first and second cylinders causes longitudinal motion of said cylinders and said satellite gears relative to each other.

12. A differential according to claim 11, wherein said longitudinal motion of the cylinders causes motion of the external teeth of the satellite gear relative the base wall and the teeth of the planetary gear.

13. A differential according to claim 11, wherein said planetary gear is formed at the socket with the base wall and a side wall forming an internal space, the internal teeth are provided in the internal space of the socket.

14. A differential according to claim 11, wherein said base wall is a rim.

* * * * *